United States Patent [19]

Takatori

[11] 4,380,771

[45] Apr. 19, 1983

[54] INK JET RECORDING PROCESS AND AN APPARATUS THEREFOR

[75] Inventor: Yasushi Takatori, Sagamihara, Japan

[73] Assignee: Canon Kabushiki Kaisha, Tokyo, Japan

[21] Appl. No.: 276,673

[22] Filed: Jun. 23, 1981

[30] Foreign Application Priority Data

| | | | |
|---|---|---|---|
| Jun. 27, 1980 | [JP] | Japan | 55-87461 |
| Jun. 27, 1980 | [JP] | Japan | 55-87462 |
| Jun. 27, 1980 | [JP] | Japan | 55-87464 |
| Jun. 27, 1980 | [JP] | Japan | 55-87465 |
| Jun. 27, 1980 | [JP] | Japan | 55-87466 |
| Jun. 27, 1980 | [JP] | Japan | 55-87469 |

[51] Int. Cl.[3] .......... G01D 15/18

[52] U.S. Cl. .......... 346/140 R; 346/1.1

[58] Field of Search .......... 346/140 PD, 1

[56] References Cited

U.S. PATENT DOCUMENTS

| | | | |
|---|---|---|---|
| 4,164,745 | 8/1979 | Cielo et al. | 346/140 PD |
| 4,313,684 | 2/1982 | Tazaki et al. | 346/140 PD X |
| 4,320,406 | 3/1982 | Heinzl | 346/140 PD |
| 4,334,234 | 6/1982 | Shirato et al. | 346/140 PD |

FOREIGN PATENT DOCUMENTS

| | | | |
|---|---|---|---|
| 54-6538 | 1/1979 | Japan | 346/140 PD |
| 55-28826 | 2/1980 | Japan | 346/140 PD |
| 55-42858 | 3/1980 | Japan | 346/140 PD |
| 55-90376 | 7/1980 | Japan | 346/140 PD |
| 55-142658 | 7/1980 | Japan | 346/140 PD |
| 55-142662 | 7/1980 | Japan | 346/140 PD |

*Primary Examiner*—George H. Miller, Jr.

*Attorney, Agent, or Firm*—Fitzpatrick, Cella, Harper & Scinto

[57] ABSTRACT

An ink jet recording process carrying out color printing by using plural inks of various colors and an ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, length of the liquid chamber varying for different color inks, is characterized in that printing is carried out by using plural color inks, each having an adjusted viscosity so that the loss of head in-friction inside the liquid chamber is substantially equal with regard to each of color inks.

8 Claims, 9 Drawing Figures

INK JET RECORDING PROCESS AND AN APPARATUS THEREFOR

BACKGROUND OF THE INVENTION

1. Field of the Invention

The present invention relates to an ink jet recording process and an apparatus therefor, in which a color recording is carried out by ejecting various color inks from each of a plurality of orifices corresponding to each of the various color inks.

2. Description of the Prior Art

The ink jet recording process is a recording process which possesses the following various advantages.

(1) Plane paper can be used for the process.

(2) High-speed printing can be carried out by the process.

(3) Little noise occurs upon printing.

(4) The apparatus can be compacted.

(5) Maintenance of an apparatus is easily carried out.

(6) Multi-color printing is easily carried out.

Since the ink jet recording process possesses various advantages as described above, various types are proposed.

While the ink jet recording process can easily, in principle, carry out multi-color printing and produce colored printed letters having excellent quality in comparison to the other recording processes, the ink jet recording process is behind in practical use compared to the other recording process.

The causes of the above-mentioned situation are as follows. In the conventional process using electromechanical conversion elements such as piezo-elements and the like, the conventional process is unable to carry out multi-color printing having at least two colors or full-color printing while keeping high quality and high resolution of printed letters at high speed, since a recording head for printing can not be constructed compactly and the ejecting orifices can not be disposed in high density.

Recently, an ink jet recording process based on a quite different principle for forming flying droplets has been disclosed in DOLS 2843064.

In the ink jet recording process disclosed in the above-mentioned Gazette, a recording head can be very compactly prepared and the ejecting orifices disposed in high density, therefore the process possesses the advantages that printing can produce printed letters having high quality and high resolution at high speed, and the like.

Referring to FIG. 1, there is described an embodiment of a recording head 101 to be used in such a recording process.

An ink jet recording head shown in FIG. 1 is provided with plural orifices 106 (in FIG. 1, five orifices are shown) for ejecting an ink as droplets on a plane where the ink is ejected, a common ink chamber 108 which is disposed in parallel with the ink-ejecting plane, and a number of liquid chambers 104 through which each orifice is in communication with the common ink chamber 108.

In FIG. 1, the five ejecting orifices 106 (106-1 to -5), five liquid chambers (104-1 to -5) which each one of the chambers is in communication with each ejecting orifice, and the common ink chamber 108 which is communication with each one of liquid chambers 104 are formed by joining a substrate 102 to a cover 103 having grooves for forming liquid chambers and a concavity for forming the common ink chamber as shown in FIG. 1.

Heaters 105 are formed on the substrate 102 as means for generating heat energy corresponding to a printing signal by microfabrication such as thin-film forming process including sputtering process, vacuum deposition process, and the like, etching process, and the like. An ink which is ejected from the orifices 106 in form of droplets is introduced into the common ink chamber 108 through the ink supply tubes 107-1 and -2, and supplied to each one of liquid chambers 104. Bubbles are generated in the ink by heat energy applied from the heaters 105 to the ink supplied into each one of liquid chambers 104, then the ink is ejected in form of droplets from desired orifices 106 by being subjected to sudden pressure change resulting from the bubbles. One of the ink supply tubes 107-1 and -2 may be used for taking out bubbles from the ink.

In an ink jet recording process using the recording head shown in FIG. 1, it is easier in comparison with the case of the above-mentioned conventional process to embody an apparatus for multi-color or full-color printing with the above-mentioned high printing characteristics. However, there remain some points to be improved for enhancement of quality of the printed letters at high speed. Further, since each one of the various inks possesses different characteristics in the case of multi-color or full-color printing, it is desired to develop a recording head which possesses characteristics and structure which are adaptable so as to meet characteristics of all the inks used.

SUMMARY OF THE INVENTION

It is an object of the present invention to improve a conventional color ink jet recording process and an apparatus therefor.

It is another object of the present invention to provide a color ink jet recording process and an apparatus therefor by which multi- or full-color recording can be effected at high speed while keeping the high quality and high resolution of the printed letters.

It is a further object of the present invention to provide a color ink jet recording process and an apparatus therefor capable of carrying out a multi- or full-color recording free from unevenness of color and distortion in the printed letters.

According to one object of the present invention, there is provided an ink jet recording process for carrying out color printing by using plural inks of various colors and an ink jet recording head which comprises: plural orifices for each of color inks; common liquid chambers, each chamber being common to said orifices for the same color ink; and a plurality of long and thin liquid chambers communicative with of orifices said each common chamber corresponding to the plural orifices possessing means for forming flying ink droplets, length of the liquid chamber varying for different color inks, characterized in that printing is carried out by using plural color inks, each having an adjusted viscosity so that the loss of head in-friction inside the liquid chamber is substantially equal with regard to each of color inks.

According to another object of the present invention, there is provided an ink jet recording process carrying out color printing by using plural inks of various colors and an ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, characterized in that printing is carried out in such a way that energy for forming ink droplets generated by means for forming ink droplets is adjusted depending upon characteristics of each of color inks.

According to a further object of the present invention, there is provided an ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, length of the liquid chamber varying for different color inks, characterized in that the head is provided with an ink viscosity adjusting means for adjusting viscosity of each color ink to make substantially equal the loss of head in-friction in the inside of the liquid chamber with regard to each of color inks.

According to a still another object of the present invention, there is provided an ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, characterized in that the loss of head in-friction in the inside of the liquid chamber with regard to each color inks are made equal in such a way that lengths of flow lines in all liquid chambers are made substantially equal.

According to a still further object of the present invention, there is provided an ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, characterized in that the following relationship is present, $L_{ohc}/L_{hcn}=k$ (k is a constant to be unequivocally determined by the type of an ink to be used.)

between $L_{ohn}$ which is a length of a flow line in the liquid chamber from the orifice through the means for forming flying ink droplets and $L_{hcn}$ which is a length of the flow line in the liquid chamber from the means for forming flying ink droplets through the common ink chamber.

According to a still further object of the present invention, there is provided an ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, characterized in that there are provided between the adjacent orifices grooves to separate ejecting planes of these orifices.

DESCRIPTION OF THE PREFERRED EMBODIMENTS

Figure 2:
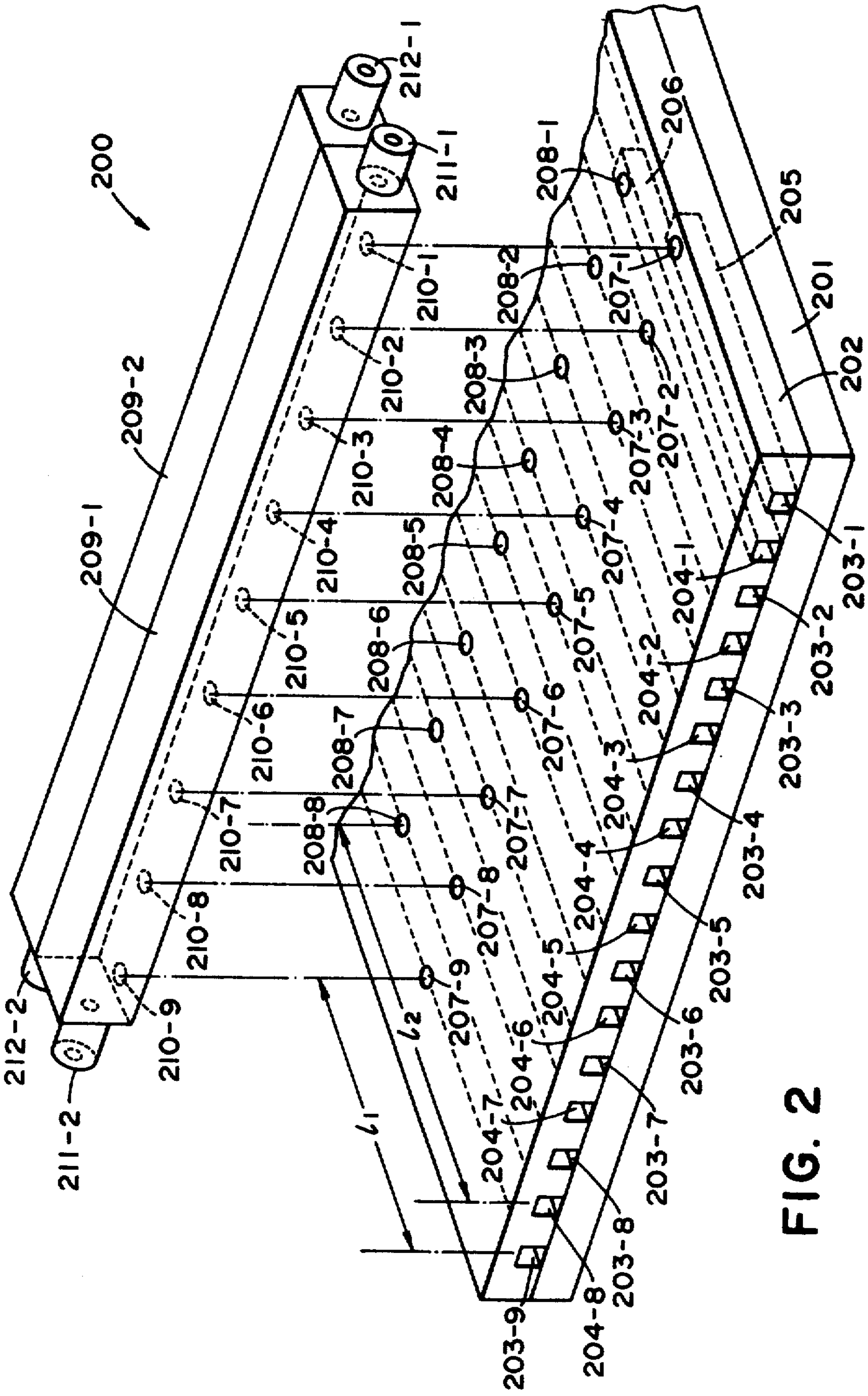
FIG. 2 is a schematic perspective view of a color ink jet recording apparatus for the first embodiment according to the present invention.

FIG. 2 shows the first embodiment of the present invention.

Figure 1:
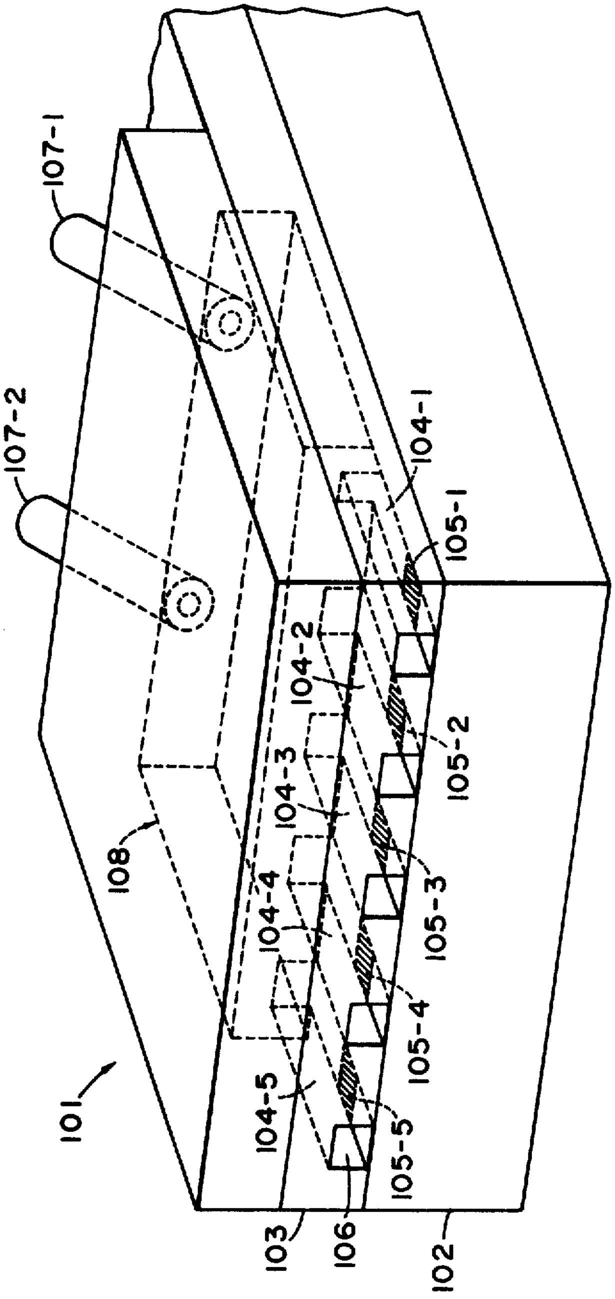
FIG. 1 is a schematic perspective view of a conventional monochromic ink jet recording apparatus.

A recording head 200 shown in FIG. 2 is a means for forming flying ink droplets in similar way to that of the recording head shown in FIG. 1. In the recording head 200, ejecting orifices 203 and 204, and liquid chambers 205 and 206 of which each chamber is in communication with a corresponding orifice are formed by joining a substrate 201 and a cover 202. There are disposed heaters and electrodes by which electric signals are applied to the heaters so as to generate heat according to the signals on the substrate 201 in a desired pattern. The cover 203 is provided with a number of grooves which are juxtaposed in a desired density and a desired space. Therefore, the ejecting orifices 203 and 204 are disposed in a desired space.

There are disposed on the upper surface of the cover 202 liquid supply ports 207 and 208 which are in communication with each liquid or supply. A common liquid chamber member 209-1 having a common liquid chamber is disposed on the liquid supply ports 207-1 to -9. The common liquid chamber member 209-1 possesses liqud outlet ports 210-1 to 210-9 which correspond to the supply ports 207-1 to 207-9 and are in communication with the common liquid chamber on the bottom surface of the common liquid supply member 209-1. The common liquid supply member 209-1 is connected on the cover 202 in such a way that each liquid flow-out ports 210-1 to 210-9 is faced to correspondingly each supply ports 207-1 to 207-9.

A common liquid chamber member 209-2 is also connected on the cover 202 in such a way that each flow-out port (not shown in FIG. 2) disposed on the bottom surface of the member 209-2 is correspondingly faced to each supply ports 208-1 to 208-8.

In the case of FIG. 2, a different color ink is supplied to common liquid chamber members 209-1 and -2, and each common liquid chamber. Each color ink is supplied from its corresponding liquid chamber to corresponding liquid chambers to fill each liquid chamber by the ink. In other words, for example, a red ink is supplied into each liquid chambers 205 corresponding to each supply ports 207-1 to 207-9 from the common liquid chamber disposed on the common liquid chamber member 209-1 through the supply ports 207. On the other hand, for example, a black ink is supplied into each liquid chambers 206 corresponding to each supply ports 208 from the common liquid chamber disposed on the common liquid chamber member 209-2 through supply ports 208-1 to 208-8. Then, for example red ink droplets are ejected from the ejecting orifices 203-1 to 203-9 by applying an electric signal to heaters (not shown) disposed within each liquid chamber and heating them.

In the case of the recording head shown in FIG. 2, since a distance from an ejecting orifice of a liquid chamber to a liquid supply port is different with regard to the individual inks, a resistance of each inks to the inside of the individual liquid chambers is different from that of the other. Therefore, liquid droplets ejecting speed, ejection response frequency, and the like become different with regard to each ink. For these reasons, quality of the printed letters obtained by the ink jet recording process may be lower in certain cases.

For avoiding these disadvantages, the present invention first proposes the following embodiment. Attention is given to the fact that the resistance of ink to an inside of a liquid chamber is mainly influenced by viscosity, density, and the like of the liquid. Accordingly, it is proposed that a difference between resistances of insides of liquid chambers resulting from a difference between flow line lengths is compensated by adjusting viscosity, density and the like of each color ink.

In other words, when l represents a length of a liquid flow line, in a liquid chamber R a radius of an approximate circular cross section based on that of a liquid chamber, $\eta$ viscosity of a liquid flowing within the liquid chamber, and $\rho$ density of the liquid, the viscous resistance $\delta$ of the liquid is represent by the following equation.

$$\delta = \frac{3\eta_1 \cdot l}{\rho \cdot R^3} \qquad (1)$$

Accordingly, in FIG. 2, when $l_1$ and $l_2$ represent lengths of flow lines in liquid chambers 205 and 206, respectively, $\eta_1$ and $\eta_2$ viscosities of color inks flowing within the liquid chambers 205 and 206, respectively, $\rho_1$ and $\rho_2$ densities of the inks, respectively, $\delta_1$ and $\delta_2$ viscous resistances of the color inks, respectively, and the radii with regard to each liquid chamber is equal, the following equation is valid.

$$\delta_1/\delta_2 = \frac{3\eta_1 \cdot l_1}{\rho_1 \cdot R^3} \Big/ \frac{3\eta_2 \cdot l_2}{\rho_2 \cdot R^3} = \frac{\eta_1 \cdot l_1}{\rho_1} \Big/ \frac{\eta_2 \cdot l_2}{\rho_2} \qquad (2)$$

When $l_1$ is equal to 2 (mm), $l_2$=3 (mm), and R=20 (microns) in the ink jet recording head, and these values are substituted in Equation (2), the following equation is obtained.

$$\delta_1/\delta_2 = \frac{\eta_1 \cdot 2}{\rho_1} \Big/ \frac{\eta_2 \cdot 3}{\rho_2} \qquad (3)$$

If $\delta_1$ is equal to $\delta_2$, the following equation is obtained from Equation (3).

$$\frac{\eta_1}{\rho_1} \Big/ \frac{\eta_2}{\rho_2} = \frac{3}{2} \qquad (4)$$

When $\rho_1$ is nearly equal to $\rho_2$ in Equation (4), the following equation is obtained.

$$\eta_1/\eta_2 = \frac{3}{2}$$

Therefore, $$\eta_2 = \frac{2}{3} \cdot \eta_1 \qquad (5)$$

Accordingly, when viscosities of inks to be used are adjusted so as to satisfy the relation expressed by Equation (5), a resistance to an inside of a flow line can be substantially made equal to that of the other. Therefore, an image free from unevenness of color and distortion can be obtained in high resolution and at high speed.

For demonstration of the above description, the following test was carried out by using a recording head having a structure similar to that shown in FIG. 2.

A black ink having the following composition was supplied from liquid supply tubes 211-1 and -2 to a common liquid chamber disposed in a common liquid chamber member 209-1 and the liquid chambers 205 being in communication with the common liquid chamber to fill the insides of the liquid chambers with the ink. An ink droplets ejecting test was carried out by driving a heater provided in each liquid chambers to measure a position where an ink droplet adheres to a recording paper.

In this case, length $l_1$ of the flow line of a liquid chamber 205 was 2 mm.

A viscosity $\eta_2$ of an ink was evaluated by using Equation (5), which is supplied into a liquid chamber 206 from supply tubes 212-1 and -2 through a common liquid chamber disposed in a common liquid chamber member 209-2, then the following equation was obtained.

$$\eta_2 = \frac{2}{3} \cdot \eta_1 = \frac{2}{3} \times 2.6 = 1.73$$

Therefore, inks (sample B, C and D) having a viscosity approximately equal to the above value and a comparative ink having a viscosity different from the above value were prepared in such a way in the following table. Each one of these inks (sample B, C, D and the comparative ink) was ejected from the liquid chamber 206 having a flow line $l_2$ of 3 mm length. The obtained results were compared with results obtained by ejecting the ink from the liquid chamber 205 having a flow line $l_1$ of 2 mm length. The comparison was carried out with regard to the positions where the ink droplets adhere to surface of a recording paper. In other words, there was determined a degree that a position where an ink droplet from the liquid chamber 206 adheres on the recording paper different from a position where an ink droplet from the liquid chamber 205. Denoted by "O" is a situation where a determined difference is at highest ±5% based on a radius of a printed dot, denoted by "X" is a situation where a difference is over ±5%.

The above-mentioned test was carried out under the conditions that each heaters disposed in each liquid chamber was driven under the same conditions. The determination also was carried out by using at least 5000 ejecting droplets for one liquid chamber.

| Ink A | |
|---|---|
| Water | 60 gr. |
| Ethylene glycol | 40 gr. |
| Black Dye | 1 gr. |

(Trade name: Water Black 200L, Supplied by Orient Chem. Ind. Ltd.)

The resulting ink A has the following viscosity and density. $\eta_1 = 2.6$ cps. $\rho_1 = 1.1$ (gr./cm$^3$)

| Sample | Composition | | $\eta_2$ (cps) | $\rho_2$ (gr/cm$^3$) | Evaluation |
|---|---|---|---|---|---|
| Comparative Sample | Water | 60 gr. | 2.6 | 1.1 | X |
| | Ethylene glycol | 40 gr. | | | |
| | Red Dye* | 1 gr. | | | |
| Sample B | Water | 75 gr. | 1.7 | 1.1 | O |
| | Ethylene glycol | 25 gr. | | | |
| | Red Dye* | 1 gr. | | | |
| Sample C | Water | 80 gr. | 1.7 | 1.0 | O |
| | Ethylene glycol | 20 gr. | | | |
| | Red Dye* | 1 gr. | | | |
| Sample D | Water | 80 gr. | 1.8 | 1.0 | O |
| | Ethyl-Cellosolve | 20 gr. | | | |
| | Red Dye* | 1 gr. | | | |

*Trade Name: Water Red No. 9, supplied by Orient Chem. Ind. Ltd.

As described above, a difference between viscous resistances resulting from a difference between lengths of liquid chambers can be substantially compensated by adjusting viscosities of inks to be used.

Figure 3:
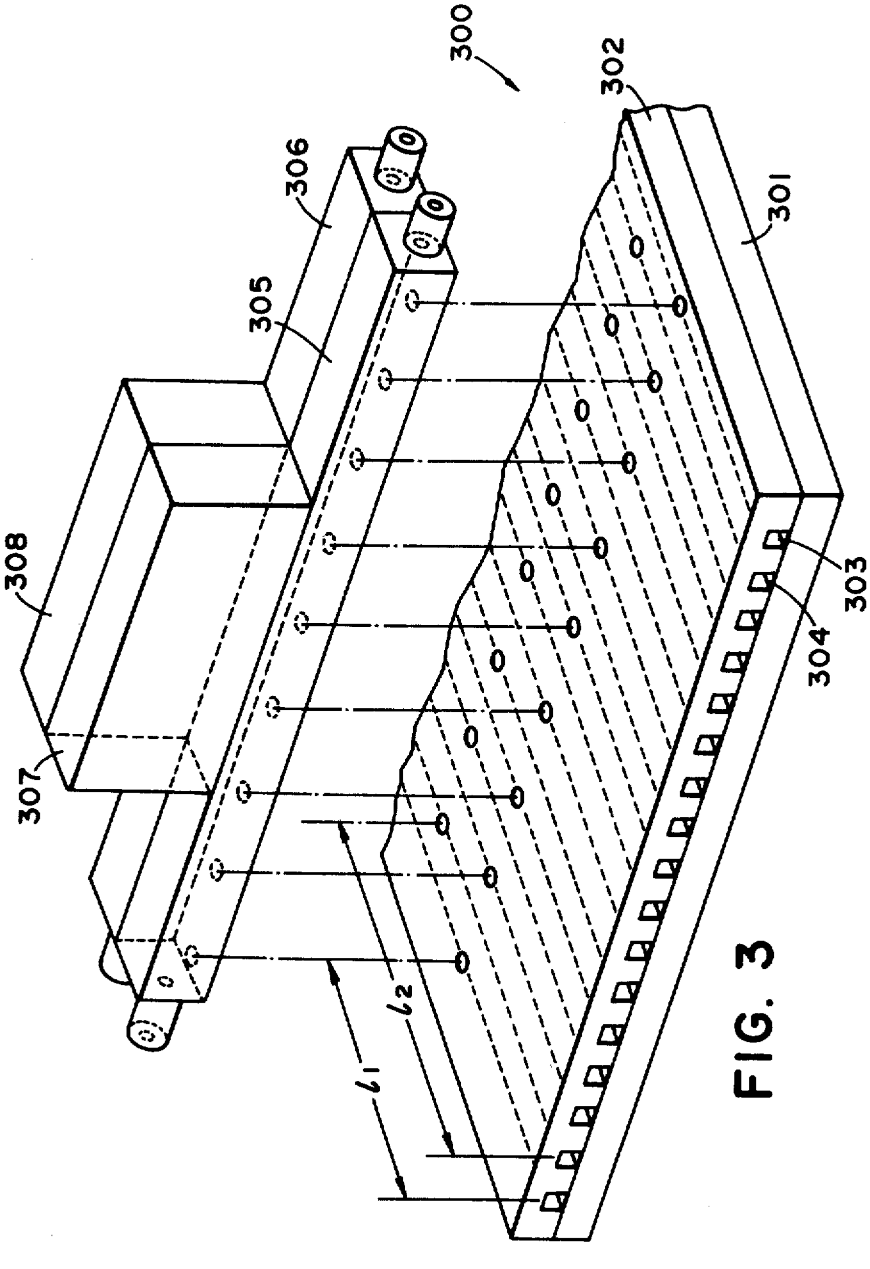
FIG. 3 is a schematic perspective view of an ink jet recording apparatus for the second embodiment according to the present invention.

FIG. 3 shows the second embodiment according to the present invention. A recording head shown in FIG. 3 has a fundamental structure similar to that of the recording head shown in FIG. 2. However, the recording head of FIG. 3 is different from that of FIG. 2 in that the head of FIG. 3 possesses ink viscosity adjusting means on each common liquid chamber corresponding to each different color ink.

In other words, in the description of FIG. 2, an embodiment has been described that viscosity of each ink to be used is adjusted upon preparing the inks so as to satisfy Equation (5). However, the second embodiment is a method that viscosity of each ink to be used is adjusted by using the ink viscosity adjusting means disposed on each common liquid chamber member so as to satisfy Equation (5).

Advantages of the second embodiment are as follows. Firstly, it is not required to pre-adjust viscosity of each color ink to satisfy Equation (5). Secondly, it is possible to adjust a deviation from Equation (5) when the ink viscosity changes due to temperature variation in the circumstance where an apparatus is used.

A recording head 300 shown in FIG. 3 comprises a substrate 301 and a cover 302 which possess the similar structure to that shown in FIG. 2. The substrate and the cover form plural liquid chambers to be filled with color inks, respectively, and each ejecting orifices 303 and 304 which is in communication with each liquid chambers and disposed at the liquid chambers. Common liquid chamber members 305 and 306 are disposed on the upper portion of the cover 302 so as to be in communication with each liquid chamber corresponding to each color ink. Common liquid chamber members 305 and 306 possess ink viscosity adjusting means 307 and 308, respectively.

The viscosity adjusting means 307 and 308 apply heat or cool to ink within the common liquid chambers provided in the common liquid chamber members 305 and 306 to adjust viscosities of color inks, respectively. In the case of using a constant ink usually, either heat or cold is applied. However, it is preferable that heating or cooling can be variably applied to inks.

The following tests were carried out by using a trial recording head having a similar structure shown in FIG. 3 at the room temperature 25° C. In this case, $l_1$ was designed to be equal to 2 mm, and $l_2 = 3$ mm.

The previously described ink A ($\rho_1 = 1.1$ gr/cm$^3$) was used for an ink to be introduced in to a liquid chamber having a flow line of 2 mm length. Now $l_1 = 2$ mm $l_2 = 3$ mm, these value were substituted into Equation (3), and the following equation was obtained.

$$\eta_1 = \frac{3}{2} \cdot \eta_2 \cdot \frac{\rho_1}{\rho_2} \qquad (6)$$

The viscosity of the ink (A), $\eta_2 = 2.6$ cps, was substituted into Equation (6), the following equation was obtained.

$$\eta_1 = \frac{3}{2} \times 2.6 \times \frac{\rho_1}{\rho_2} \qquad (7)$$

If $\rho_1 = \rho_2$, then, $\eta_1 = 3.9$ cps.

Instead of the black dye of the previously described black ink A, an ink AA was prepared by using a red dye (Trade name, Water Red No. 9, supplied by Orient Chem. Ind. Ltd.) to introduce into the common liquid chamber 306 being in communication with a liquid chamber having a flow line of 3 mm length. The ink in the common liquid chamber member 306 was cooled to 12° C. and regulated at 12° C. by operating the viscosity adjusting means 308 so that the viscosity of the cooled ink could become the value of Equation (7).

As described above, droplets of the black ink were ejected from the ejecting orifice 303, and droplets of the red ink from the ejecting orifice 304, and points were determined where each ink droplets adhered on a recording paper.

As the results, an excellent printing is carried out without color deviation on both black and red, an obtained image has high quality.

On the contrary, when an ink droplets ejecting test was carried out under the same conditions as the mentioned above except that the viscosity adjusting means 308 was not operated, points (impact areas) where droplets of the red ink adhered on a recording paper deviated more largely in comparison with the case of the black ink. In other words, there was observed unevenness of color and distortion in an image.

Next, the third embodiment according to the present invention will be explained.

In case that recording heads having liquid chambers of different lengths were used corresponding to inks to be used, as the recording head shown in FIG. 2, respectively, the objects of the present invention can be attained by the following way, besides the first embodiment in which physical properties of inks to be used are adjusted upon preparing so that inside resistances of liquid chambers corresponding to inks become equal.

For example, in case that a black ink is supplied to a liquid chamber having a flow line of $l_1$ in length from the corresponding common liquid chamber and a red ink to the other liquid chamber having a flow line of $l_2$ in length from the corresponding common chamber so that printing is carried out, if equal energy for ejecting a droplet is applied to each ink within each liquid chamber, points where ink droplets adhere to a recording paper deviate between different inks due to difference in flow line lengths and properties of inks to be used. In other words, printing can not be carried out in high quality because of disorder in printed letters and color deviation.

Therefore, in the third embodiment, an energy applied to each ink for ejecting an ink droplet is adjusted so that flying state of inks can be made uniform between color inks. In other words, a deviation of points where ink droplets adhere to a recording paper, resulting from flying state of ink droplets different between color inks on the ground of variation in length of a flow line of a liquid chamber and in physical properties of the ink when applying an equal energy to each color inks for ejecting an ink droplet, is compensated by adjusting an energy applied to each color ink for ejecting an ink droplet with regard to each color ink.

For demonstrating effectiveness of the third embodiment, the following test was carried out.

A color ink jet recording head was manufactured which possesses a similar construction and form to the head shown in FIG. 2.

In this head, height of the liquid chamber was 0.04 mm (cross section of the orifice 0.0016 mm$^2$), lengths $l_1$ and $l_2$ of liquid flow lines 2 mm and 3 mm, respectively. Inks of the following compositions were prepared and filled into the corresponding liquid chamber.

| Ink 1-1 (for the liquid chamber of $l_1$) | |
|---|---|
| Water | 70 parts |
| Ethylene glycol | 30 parts |
| Black dye | 1 part |

(Trade name: Water Black No. 200L, supplied by Orient Chem, Ind. Ltd.)

| Ink 2-1 (for the liquid chamber of $l_2$) | |
|---|---|
| Water | 70 parts |
| Ethylene glycol | 30 parts |
| Red dye | 1 part |

(Trade name: Water Red. No. 9, supplied by Orient Chem, Ind. Ltd.)

In all liquid chambers, a space between orifice heaters was 0.15 mm, and area of the heater 0.15×0.04 mm$^2$, resistance of the heater 150Ω.

To heaters in liquid chambers filled with Ink 2-1 were applied a pulse of 25 V for 10 μsec. and to heaters in liquid chambers filled with Ink 1-1 a pulse of 30 V for 10 μsec. to obtain an excellent ink jet print having two colors free from a deviation between black and red dots. On the contrary, when a pulse of 25 V also was applied to heaters for Ink 1-1 in the same way as that for Ink 2-1, an obtained ink jet print showed a deviation between black and red dots, and its quality lowered.

Tests for observating ejecting state of ink droplets were carried out by using inks having the follow components and a recording head having a similar construction to that shown in FIG. 2 prepared under the following conditions.

[Conditions for preparing a head]

Height of liquid chambers: 0.04 mm (Cross section of the orifice: 0.0016 mm$^2$)

$l_1$ = 2 mm $l_2$ = 3 mm

A space between orifices of chambers = 0.12 mm

Area of the heater in the chamber of $l_1$ = 0.2×0.04 mm$^2$ (Resistance: 200Ω)

Area of the heater in the chamber of $l_2$ = 0.15×0.04 mm$^2$ (Resistance: 150Ω)

| [Ink Composition]<br>Ink 1-2 (for the liquid chamber of $l_1$) | |
|---|---|
| Water | 60 parts |
| Ethylene glycol | 40 parts |
| Black dye | 1 part |

(Trade name: Water Black No. 200L, supplied by Orient Chem. Ind. Ltd.)

| Ink 2-2 (for the liquid chamber of $l_2$) | |
|---|---|
| Water | 60 parts |
| Ethylene glycol | 40 parts |
| Red dye | 1 part |

(Trade name: Water Red No. 9, supplied by Orient Chem. Ind. Ltd.)

A pulse of 28 V (5.2 W) was applied to heaters in liquid chambers filled with Ink 2-2 for 10 μsec. and a pulse of 36 V (6.5 W) to heaters in liquid chambers filled with Ink 1-2 for 10 μsec. to obtain an excellent ink jet print having two color. On the contrary, when a pulse of 32.3 V (5.2 W) also was applied to heaters in liquid chambers filled with Ink 1-2, a deviation between black and red dots occurred.

The fourth embodiment will be described below.

Figure 4:
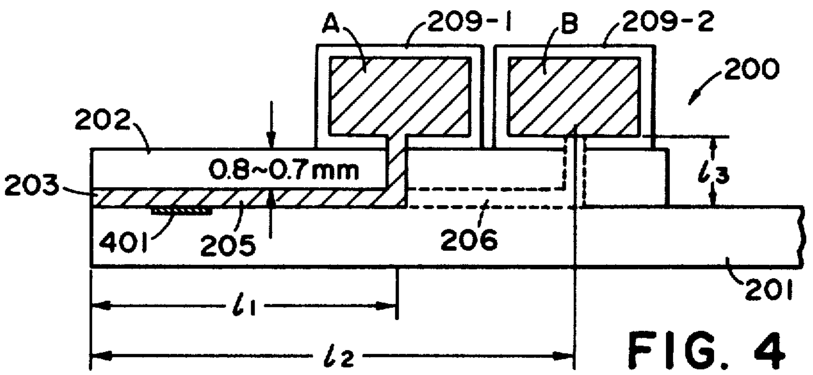
FIG. 4 is a schematic cross-sectional view of an ink jet recording apparatus for the third embodiment according to the present invention.

The recording head as shown in FIG. 2, for example, has a cross section along a line in the direction of the flow line in the liquid chamber, and a structure which are shown in FIG. 4 (For description, one portion is exaggerated in FIG. 4).

As shown in FIG. 4, since a recording head 200 is provided with a common liquid chamber 209-1 communicating to a liquid chamber having a flow line of $l_1$ in length, and a common liquid chamber 209-2 communicating to a liquid chamber having a flow line of $l_2$ in length in parallel on an upper surface of a cover 202, a difference in the length of the flow line between liquid chambers 205 and 206 occurs inevitably. Accordingly, a difference in resistance between an ink and an inside wall of a liquid chamber occurs between liquid chambers 205 and 206 so that unevenness of color and disorder of points where ink droplets adhere to a recording paper occur upon printing.

For example, the previously described ways are adopted for solving these problems.

Figure 5:
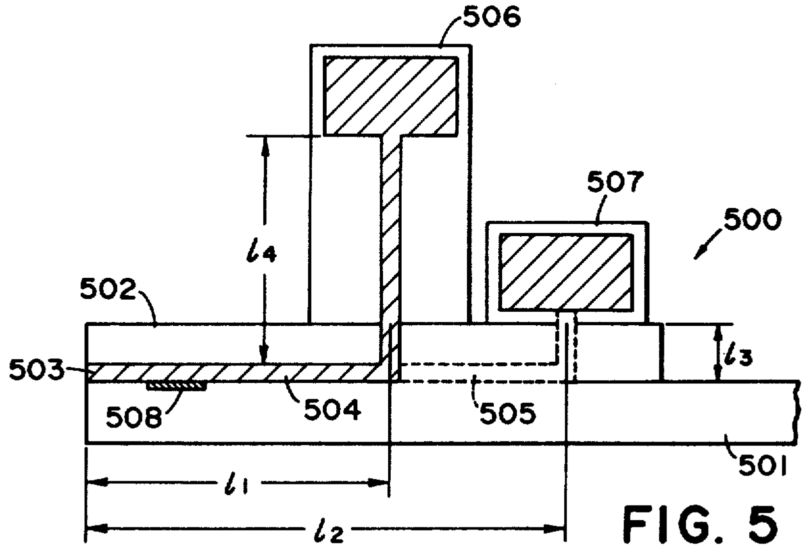
FIG. 5 is a schematic cross-sectional view of an ink jet recording apparatus for the fourth embodiment according to the present invention.
Figure 6:
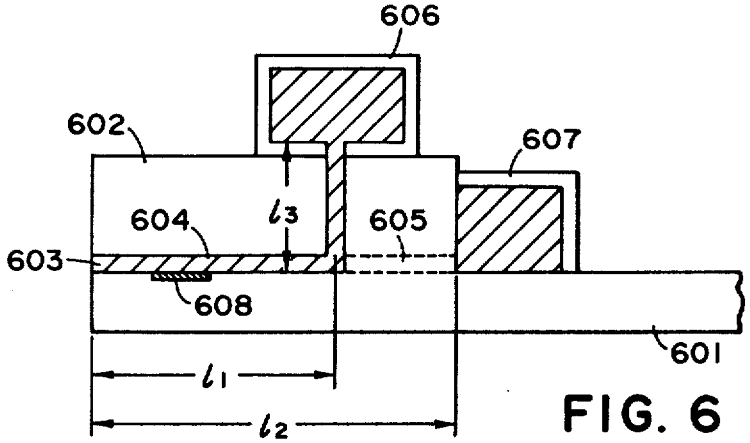
FIG. 6 is a schematic cross-sectional view of an ink jet recording apparatus for the fifth embodiment according to the present invention.

Besides these ways, ways shown in FIGS. 5 and 6 also can solve these problems, which are a modification of the way shown in FIG. 4. In FIGS. 5 and 6, length of liquid flow line between a common liquid chamber and an orifice is designed in such a way that the length is equal with regard to all liquid flow line.

In other words, a recording head 500 shown in FIG. 5 is designed in such a way that a length $(l_1+l_4)$ of a flow line between an ejecting orifice 503 and a common liquid chamber 506 communicating to a liquid chamber 504 having a flow line of length $l_1$ is substantially equal to a length $(l_2+l_3)$ of a flow line between an ejecting orifice (not shown in FIG. 5 because of out of sight) communicating to a liquid chamber 505 and a common liquid chamber 507 communicating to the liquid chamber 505 having a flow line of length $l_2$. In a recording head having such construction, if only viscosities of inks to be used are equal, even in the case of various color inks, inside resistances of liquid flow lines can be made equal. Therefore, flying state of ink droplets becomes uniform with regard to each color ink so that printing can be carried out without unevenness of color and distortion of printed letters, even if pulses having the same form are applied to all heaters 508 provided in each liquid chamber.

In the recording head 500 shown in FIG. 5, all liquid flow lines between the orifice and the common liquid chamber communicating to the corresponding orifice possess "L" shape for making equal lengths of all liquid flow lines. On the contrary, in the recording head shown in FIG. 6, a liquid flow line between orifice (not shown in FIG. 6 because it is out of the line of sight) and a common liquid chamber 607 communicating to the orifices is straight while a liquid flow line between an ejecting orifice 603 and a common liquid chamber 606 communicating to the orifice 603 possesses an "L" shape. Thus, lengths of these flow lines (length of the liquid flow line containing the liquid chamber 604 is represented by $l_1+l_3$, and length of the liquid flow line containing the liquid chamber 605 by $l_2$) are substantially made equal.

Figure 7:
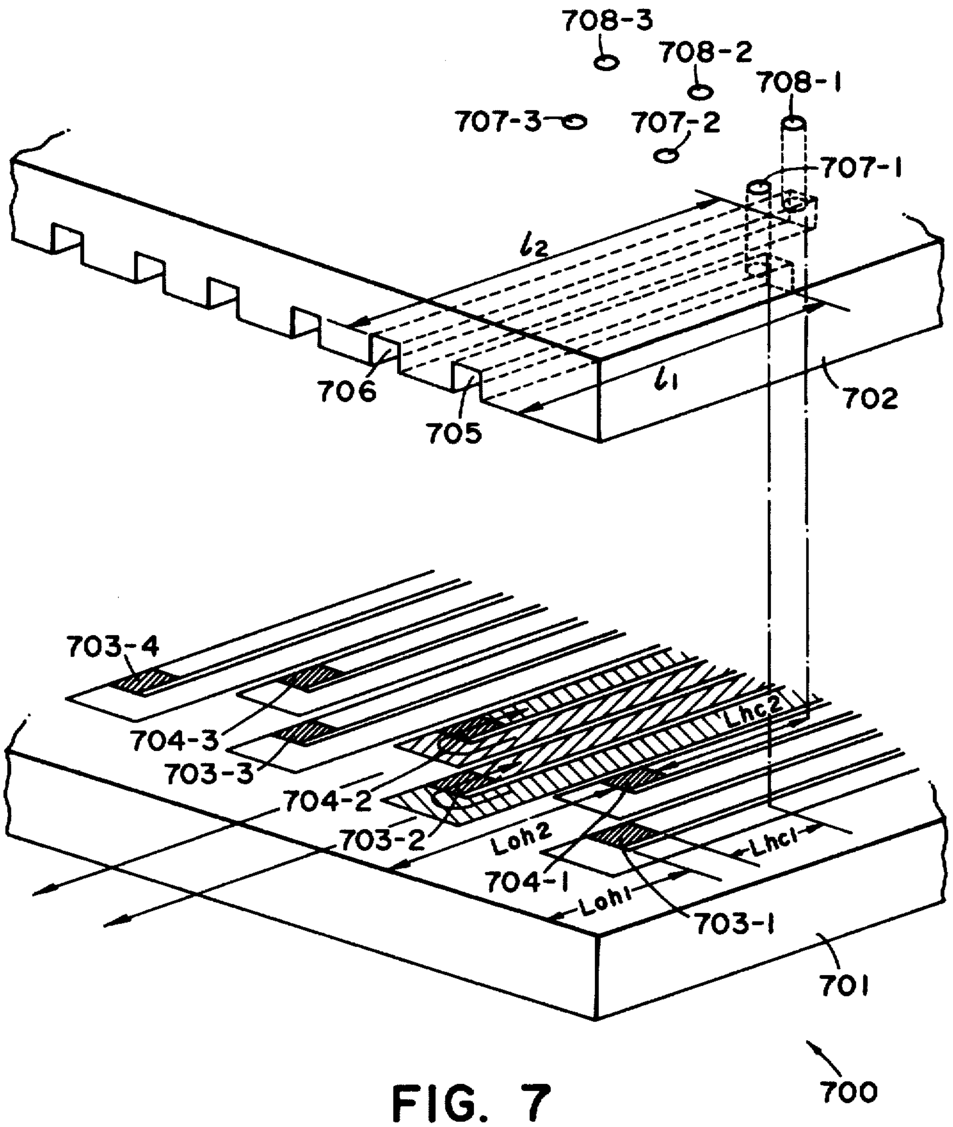
FIG. 7 is a schematic assembly drawing for an ink jet recording apparatus for the sixth embodiment according to the present invention.

FIG. 7 shows the fifth embodiment. FIG. 7 is an assembly drawing for a recording head 700 used by a color ink filling a liquid chamber having a flow line of $l_1$ in length and another color ink filling a liquid chamber having a flow line of $l_2$ in length. The recording head 700 is formed by joining a cover plate 702 comprising predetermined number of grooves for forming the liquid chambers on a substrate 701 provided with heaters 703 and 704. The liquid chamber 705 is provided with an ink supply port 707 being open at the upper portion of the cover plate 702, and an ink is supplied to the liquid chamber 705 from a common ink chamber (not shown) through the ink supply port 707. The liquid chamber 706 also is provided with an ink supply port 708 in a similar way to the case of the liquid chamber 705.

When $L_{oh}$ represents a length from an ejecting orifice plane to the heater, and $L_{ch}$ a length from the heater to the supply port communicating to the common ink chamber, optimum conditions for $L_{oh}$ and $L_{ch}$ to eject stable ink droplets are present according to a type of an ink to be used. Therefore, it is desirable that $L_{oh}$ and $L_{ch}$ are determined according to each ink upon designing a recording head to dispose heaters, when each of plural inks is supplied into each corresponding liquid chamber, heaters 703 and 704 are driven, and ink droplets are ejected by using a recording head as shown in FIG. 7.

In the recording head shown in FIG. 7, the heater 703-1 is located a length $L_{oh1}$ away from the orifice plane toward the liquid chamber 705 and $L_{hc1}$ away from the supply port toward the orifice. The heater 704-1 is located a length $L_{oh2}$ away from the orifice plane toward the liquid chamber and a length $L_{hc2}$ away from the supply port 708 toward the orifice.

In other words, in the case of the recording head 700, the interrelationship between the corresponding above lengths is represented by the following relationship.

$$L_{oh1} \neq L_{oh2} \text{ and}$$

$$L_{hc1} \neq L_{hc2}$$

The following relationship is present between $L_{oh}$ and $L_{hc}$ $$L_{oh}/L_{hc} = k \quad (8)$$

(k is a constant which is determined by the type of an ink used.)

In the present invention, k is a constant to be determined by the type of ink and k can be obtained in the following way.

In the ink jet recording process according to the present invention, an electric signal pulse corresponding to an information to be recorded is applied to a heater provided in a liquid chamber communicative with an orifice for ejecting an ink and a common ink chamber to eject an ink droplet from the orifice by momentarily generating and shrinking a bubble within the ink which fills the liquid chamber. Therefore, for forming stable flying ink droplets, it is required that generation, growth, and shinkage of the bubble are stably carried out by excellent responsiveness.

Under a constant liquid pressure, when $V_p$(cm³) represents a volume of a bubble generated within a liquid and $V_e$(cm³) a volume of a bubble generated within a liquid chamber of a recording head to be used, the following relationship is present between $V_e$ and $V_p$, $$V_e \simeq \frac{L_{hc}}{L} \times V_p \quad (9)$$

wherein L represents length of a flow line from the orifice to the inlet of the common ink chamber.

When $V_d$ represents a volume of an ink droplet ejected from the orifice by generation of a bubble, the following equation is valid.

$$V_d \simeq V_e \quad (10)$$

When $V_d$ is represented by the following equation, $$V_d = L_{oh} \times d^2 \quad (11)$$

wherein d represents a mean diameter of the orifice, the following equation is approximately valid when referring to equations (9), (10) and (11).

$$L_{oh} \times d^2 = \frac{L_{hc}}{L} \times V_p \quad (12)$$

When equation (12) is changed, the following equation is obtained.

$$k = \frac{L_{oh}}{L_{hc}} = \frac{V_p}{Ld^2} \quad (13)$$

Accordingly, when $V_p$, L and d are determined upon design of a recording head, $V_p$ being a constant (optimum value) determined by the type of an ink, k is determined. The value of k determines the optimum position of a heater provided within the liquid chamber. In other words, since L and d are values determined on the ground of working conditions upon design of the recording head, k is regarded as a constant to be determined a type of an ink.

Therefore, k is determined by determination of a type of an ink to be used. Thus, $L_{oh}$ and $L_{hc}$ are determined upon designing a recording head, and appropriate positions for the heaters can be determined.

For demonstrating effectiveness of the recording head 700 shown in FIG. 7, the following test was carried out.

A recording head having a similar constitution and structure was manufactured experimentally.

In the head, $l_1$ is 2 mm, $l_2$ is 3 mm. The following Ink A-1 was used for the liquid chamber 705, the previously mentioned Ink 2-1 for the liquid chamber 706.

| Ink A-1 | |
|---|---|
| Water | 70 parts |
| Diethylene glycol | 30 parts |
| Black dye | 1 part |

(Trade name: Water Black 200L, supplied by Orient Chem. Ind. Ltd.)

Since $V_p$ was $4.9\times10^{-7}$ cm$^3$ in this case, heaters to be disposed on the substrate 710 were located the positions so that the following equation can be satisfied. Upon experimentally manufacturing a recording head.

$$L_{oh1}/L_{hc1}=L_{oh2}/L_{hc2}=0.098$$

An ink droplets ejecting test was carried out by using the above-mentioned head and the above-mentioned red and black inks to obtain an excellent ink jet recording image without a deviation of dots.

Figure 8:
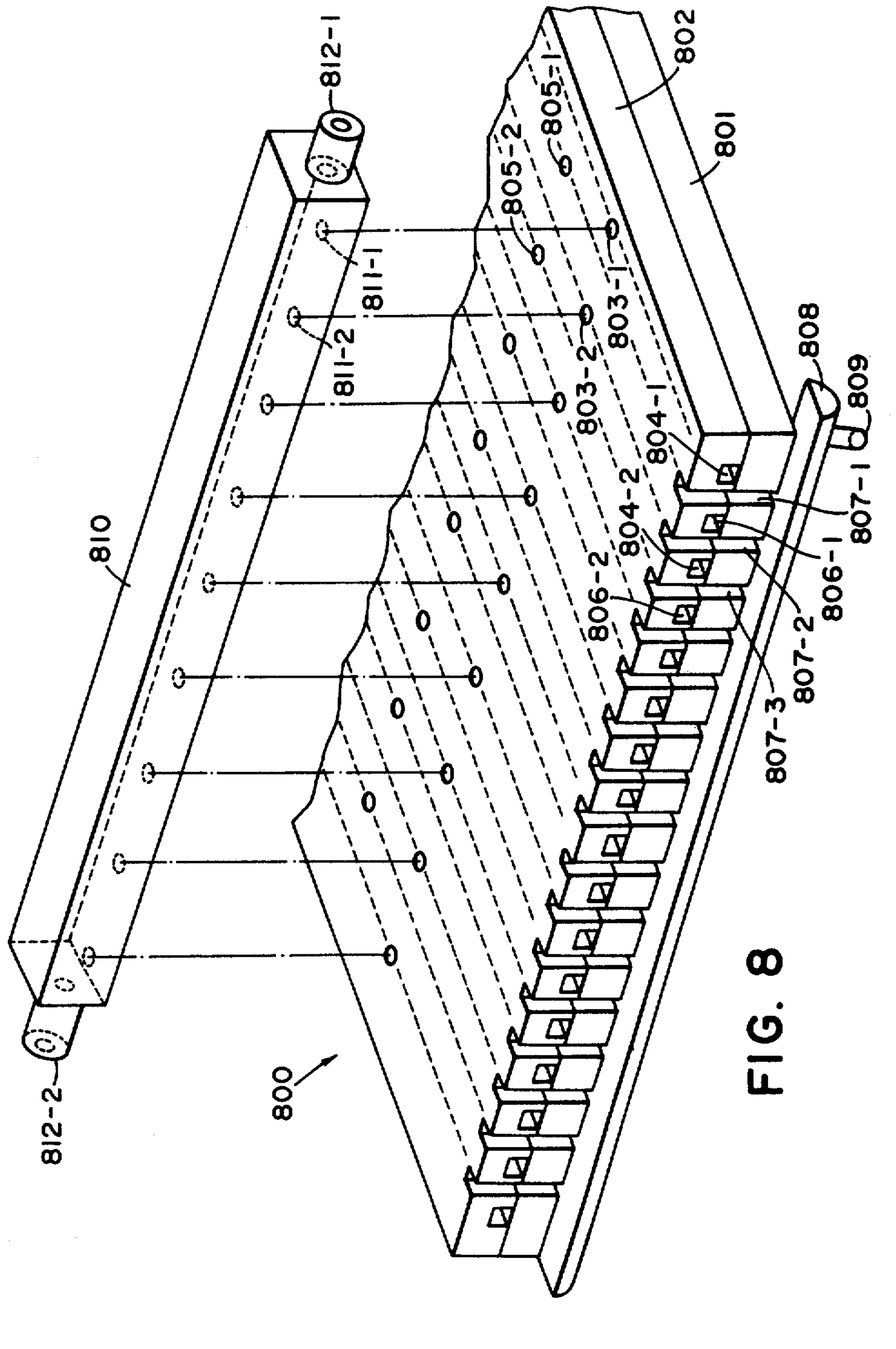
FIG. 8 is a schematic perspective view of an ink jet recording apparatus for the eighth embodiment according to the present invention.
Figure 9:
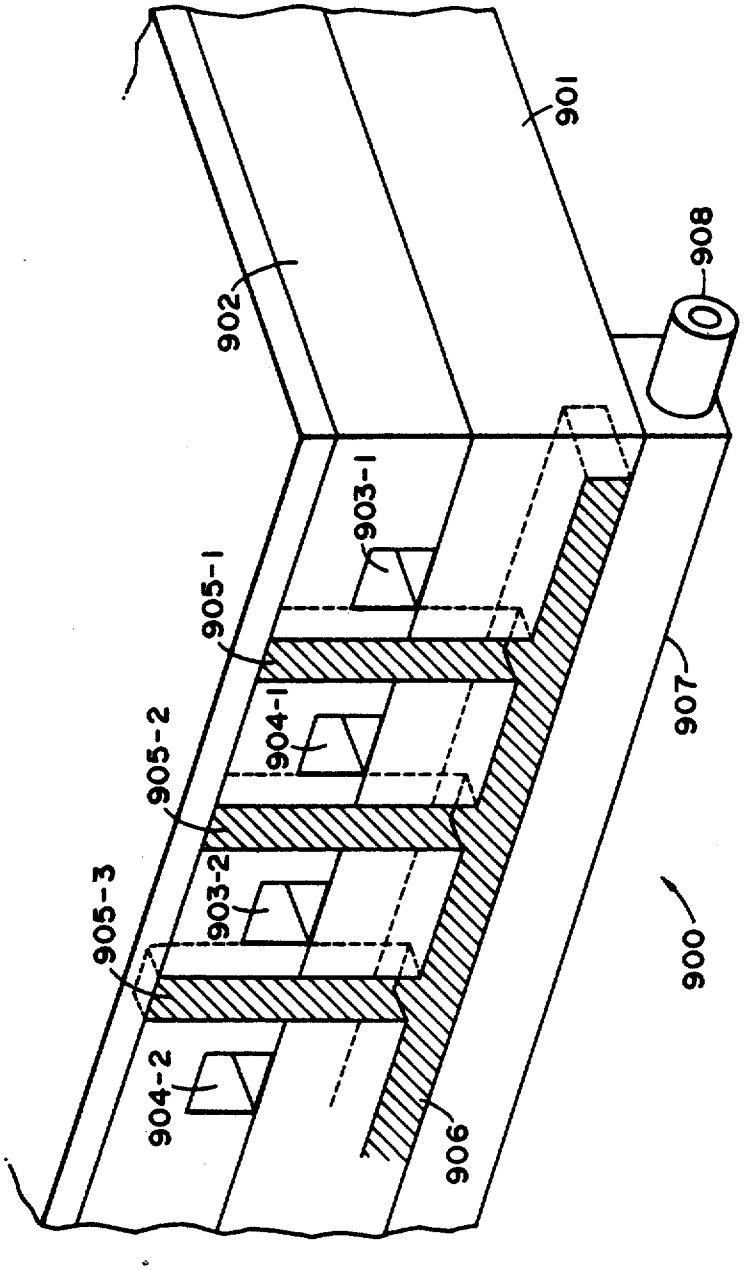
FIG. 9 is a schematic partial perspective view of an ink jet recording apparatus for the ninth embodiment according to the present invention.

FIGS. 8 and 9 show still further embodiments according to the present invention.

A multi-color ink ejecting head 800 shown in FIG. 8 is formed by joining a cover plate 802 on a substrate 801. The first color ink is supplied to liquid chambers from opening holes 803-1, 803-2, etc. to fill as far as orifices 804-1, 804-2, etc., and the ink is ejected from the orifices. The second color ink is supplied from opening holes 805-1, 805-2, etc. to each corresponding liquid chambers to fill as far as orifices 806-1, 806-2, etc.

A common liquid chamber member 810 having inside a common liquid chamber is joined to the position where openings 803-1, 803-2, etc. on the upper surface of the cover 802 are present in such a way that supply ports 811-1, 811-2, etc. provided on the bottom surface of the member 810 are located on the corresponding each of the openings 803-1, 803-2, etc., respectively.

Both ends of the common liquid chamber member 810 are provided with supply tubes 812-1 and 812-2 for supplying an ink to the common liquid chamber from an ink tank, respectively. In a similar way to that shown in FIG. 2, another common liquid chamber member (not shown) having a similar structure to that of the common liquid chamber member 810 is mounted on the openings 805-1, 805-2, etc.

In the embodiment shown in FIG. 8, there are provided between the adjacent orifices grooves 807-1, 807-2, 807-3, etc. to separate ejecting planes of these orifices, each to eject a different color ink. Grooves 807 may be made by any way, they are most preferable made by cutting. There is provided under grooves 807 a gutter 808 for recovering an ink, and a recovered ink is exhausted out the head through an exhaust tube 809. Various color inks flowing to surroundings of an orifice array are gathered grooves 807 to drop to the gutter from under portions of grooves, therefore the inks does not diffuse. Further, since grooves separate the neighboring orifices, a color ink is not mixed another color ink at an orifice.

FIG. 9 shows a still further embodiment of the present invention. In this embodiment, there are provided between the adjacent orifices (for example, between orifices 903-1 and 904-1), each to eject a different color ink, grooves 905-1, 905-2, 905-3, etc. to separate ejecting planes of these orifices, and a second gutter 906 is provided perpendicularly to the grooves 905. A porous members is packed into the gutter 906. A recovering portion 907 is disposed under the gutter 906. The recovering portion 907 is hollow, and forcibly evacuated with a pump and the like through a exhaust tube 908. In the above-mentioned way, an ink flowing to surrounding of an orifice array is absorbed to the grooves 905, gutter 906, and the porous member packed in the gutter to provide mixing between orifices.

As described above, the following advantages are attained by the above-mentioned embodiment according to the present invention.

(1) An ink is prevented from mixing with another ink at surroundings of orifices, therefore an obtained image is sharp in color.

(2) A recording head is free from ink leakage at surroundings of orifices, and it is prevented that an orifice is clogged by evaporation of an ink.

(3) An ink leakage is prevented.

(4) An ink jet recording image is brisk in color.

(5) It is possible to obtain stable droplet ejecting characteristics for a long time.

"Fluid resistance" in the present specification means "the loss of head in-friction".

What I claim is:

1. An ink jet recording process carrying out color printing by using plural inks of various colors and an ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, length of the liquid chamber varying for different color inks, characterized in that printing is carried out by using plural color inks, each having an adjusted viscosity so that the loss of head in-friction inside the liquid chamber is substantially equal with regard to each of color inks.

2. An ink jet recording process carrying out color printing by using plural inks of various colors and an ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, characterized in that printing is carried out in such a way that energy for forming ink droplets generated by means for forming ink droplets is adjusted depending upon characteristics of each of color inks.

3. An ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, length of the liquid chamber varying for different color inks, characterized in that the head is provided with an ink viscosity adjusting means for adjusting viscosity of each color ink to make substantially equal the loss of head infriction in the inside of the liquid chamber with regard to each of color inks.

4. An ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, characterized in that the loss of head in-friction in the inside of the liquid chamber with regard to each color inks are made equal in such a way that lengths of flow lines in all liquid chambers are made substantially equal.

5. An ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, characterized in that the following relationship is present, $L_{ohn}/L_{hcn}=k$ (k is a constant to be unequivocally determined by the type of an ink to be used)

between $L_{ohn}$ which is a length of a flow line in the liquid chamber from the orifice through the means for forming flying ink droplets and $L_{hcn}$ which is a length of the flow line in the liquid chamber from the means for forming flying ink droplets through the common ink chamber.

6. An ink jet recording head which comprises: plural orifices for each of color inks; common liquid chambers, each chamber being common to said orifices for the same color ink; and a plurality of long and thin liquid chambers communicative with said orifices, said each common chamber corresponding to the plural orifices possessing means for forming flying ink droplets, characterized in that there are provided between the adjacent orifices grooves to separate ejecting planes of these orifices.

7. An ink jet recording head according to claim 6 in which a porous member is disposed in said grooves.

8. An ink jet recording head according to claim 6 in which there is a gutter which extends horizontally and intersects perpendicularly the grooves.

* * * * *